United States Patent
Aaltonen

(10) Patent No.: US 7,725,835 B2
(45) Date of Patent: May 25, 2010

(54) METHOD OF FORMING MENUS

(75) Inventor: Antti Aaltonen, Tempere (FI)

(73) Assignee: Nokia Corporation, Espoo (FI)

( * ) Notice: Subject to any disclaimer, the term of this patent is extended or adjusted under 35 U.S.C. 154(b) by 9 days.

(21) Appl. No.: 10/574,123

(22) PCT Filed: Oct. 1, 2004

(86) PCT No.: PCT/FI2004/050140

§ 371 (c)(1),
(2), (4) Date: Mar. 31, 2006

(87) PCT Pub. No.: WO2005/033922

PCT Pub. Date: Apr. 14, 2005

(65) Prior Publication Data

US 2007/0067736 A1    Mar. 22, 2007

(30) Foreign Application Priority Data

Oct. 3, 2003    (FI) .................................. 20031433

(51) Int. Cl.
*G06F 3/048*    (2006.01)
*G06F 17/00*    (2006.01)

(52) U.S. Cl. .................. 715/810; 715/841; 715/835; 715/834; 715/243; 715/244

(58) Field of Classification Search ................ 715/810, 715/841, 835, 781, 834, 243, 244, 780; 345/352; 348/E5.105
See application file for complete search history.

(56) References Cited

U.S. PATENT DOCUMENTS

| | | | | |
|---|---|---|---|---|
| 5,708,787 A | * | 1/1998 | Nakano et al. | 715/841 |
| 5,923,327 A | * | 7/1999 | Smith et al. | 715/784 |
| 6,133,905 A | * | 10/2000 | Edo et al. | 345/156 |
| 6,188,406 B1 | * | 2/2001 | Fong et al. | 715/810 |
| 6,239,803 B1 | * | 5/2001 | Driskell | 715/810 |
| 7,093,201 B2 | * | 8/2006 | Duarte | 715/853 |

(Continued)

FOREIGN PATENT DOCUMENTS

EP    0 917 037    5/1999

(Continued)

*Primary Examiner*—William L Bashore
*Assistant Examiner*—David Phantana-angkool
(74) *Attorney, Agent, or Firm*—Ware, Fressola, Van Der Sluys & Adolphson LLP

(57) ABSTRACT

A method of forming a menu on a display of an electronic device is shown with at least two function elements (1) for selecting functions.
 At least three display areas (A, B, C) are defined substantially adjacent to each other in a first direction.
 At least a first identification part (2) and a second identification part (3) are defined as contained in the function elements (1)
 The first identification part (2) of a function element (1) in the first direction is displayed on the outermost display areas (A, C), and
 the second identification part (3) of the function elements (1) on at least one display area (B) between the outermost display areas (A, C) is displayed in such a manner that the second identification part of the first function element and the second identification part of the second function element are positioned at least substantially next to each other in a second direction substantially perpendicular to said first direction.
Also shown are a graphical user interface (GUI), a device, a system, a software program and to a storage medium.

22 Claims, 3 Drawing Sheets

U.S. PATENT DOCUMENTS

Figure 1:
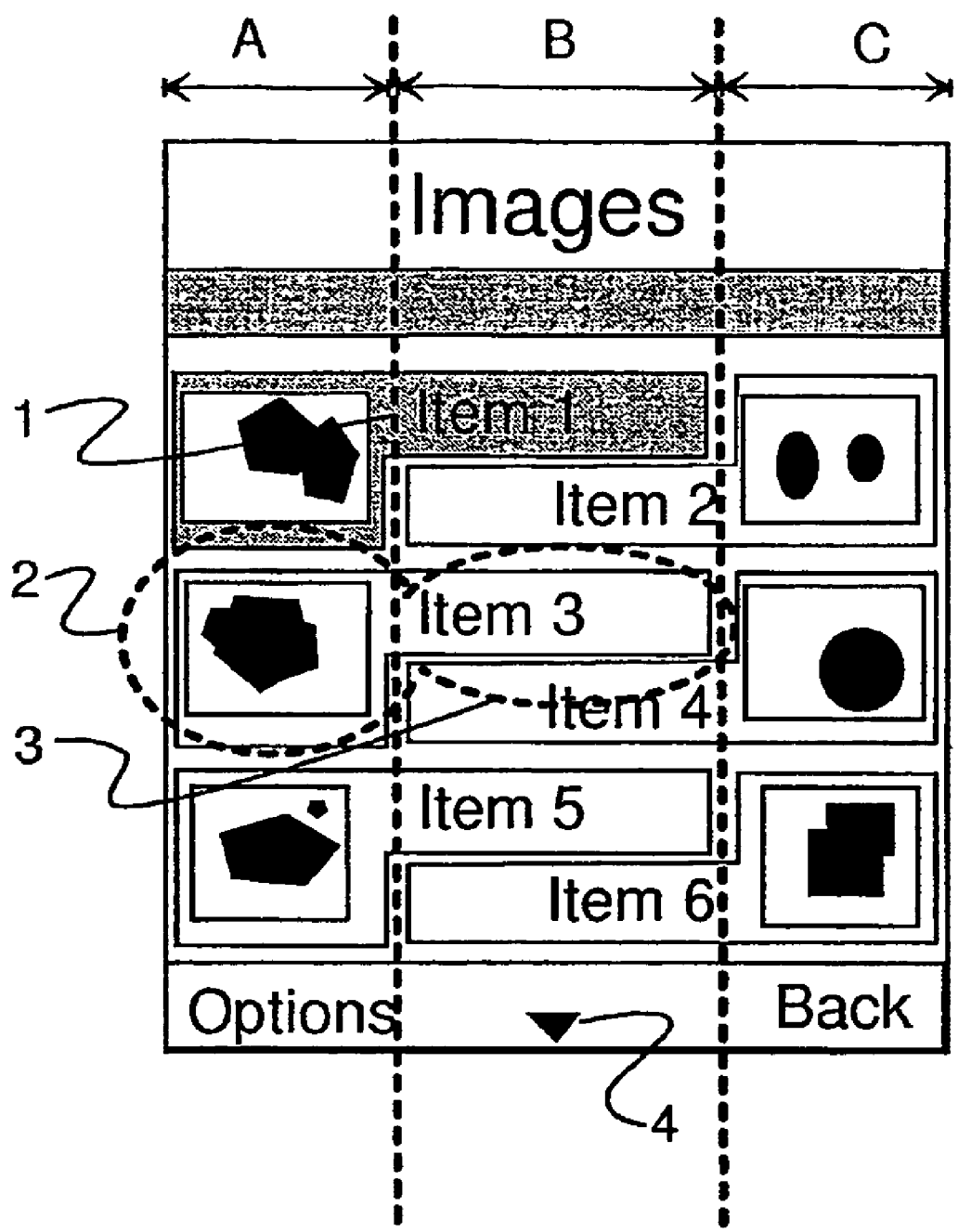

| | | | |
|---|---|---|---|
| 7,461,354 B2 * | 12/2008 | Pagan .......................... | 715/834 |
| 7,516,419 B2 * | 4/2009 | Petro et al. .................. | 715/834 |
| 7,536,653 B2 * | 5/2009 | Badovinac et al. .......... | 715/810 |
| 2004/0155907 A1 * | 8/2004 | Yamaguchi et al. ......... | 345/810 |
| 2004/0221243 A1 * | 11/2004 | Twerdahl et al. ............ | 715/834 |
| 2004/0229657 A1 * | 11/2004 | Nakanishi ................... | 455/566 |
| 2005/0050474 A1 * | 3/2005 | Bells et al. .................. | 715/747 |
| 2005/0076303 A1 * | 4/2005 | Vaananen et al. ........... | 715/713 |
| 2006/0107232 A1 * | 5/2006 | Salt et al. .................... | 715/810 |
| 2006/0123360 A1 * | 6/2006 | Anwar et al. ................ | 715/810 |
| 2007/0113204 A1 * | 5/2007 | Son et al. .................... | 715/810 |

FOREIGN PATENT DOCUMENTS

JP  10-133842  5/1998

* cited by examiner

METHOD OF FORMING MENUS

CROSS-REFERENCE TO RELATED APPLICATIONS

This application is the U.S. National Stage of International Application Number PCT/FI2004/050140 filed Oct. 1, 2004 and published Apr. 14, 2005 under International Publication Number WO 2005/033922 in English and claiming priority from Finnish Patent Application No. 20031433 filed Oct. 3, 2003.

FIELD OF THE INVENTION

The invention relates to a method for forming menus in an electronic device. The invention also relates to a graphical user interface (GUI). In addition, the invention relates to a device, to a system, to a software program, and to a storage medium.

BACKGROUND OF THE INVENTION

At present, mobile phones provide various types of functions in addition to the basic call making/receiving function. Typical examples of the functions include telephone number directories, message manager, electronic organizer, phone manager, image manager and many more. In order to use any of such functions, many mobile phones also comprise a graphical user interface (GUI).

Typically a display of a graphical user interface comprises different kinds of visual elements like menus, icons and other elements. The term 'menu' will be used hereinbelow to refer to of a list from which the user may select an operation to be performed. Usually the menu is a graphical component containing at least one functional element and it is capable of indicating the selected functional element and activating it. For the navigation between these visual elements there is typically some kind of a control device, such as a navigation key, soft keys, a joystick or a touch screen.

The present graphical user interfaces rely on presenting information in pictorial form. In one of the most common type of a graphical user interface visual elements form a list, which may be used for several purposes. For example, in imaging phones (such as Nokia 3650) the contents of the phone's photo gallery (or "images") can be presented by means of the list. Usually each item of the list consists of a thumbnail image and a label of the item for identification purposes. In a typical list these images and labels are positioned on top of each other and the user scrolls the list up and down by using a 2-way input device. In these solutions the list may consist of only a few larger images and labels or a larger number of small thumbnail images and labels. Consequently, if the user wants to use larger images he or she is able to see only a little section of the list on the display. If the user wants to see longer section of the list, he or she sees very small images and it is usually very difficult to recognize items from these small thumbnails. The possibility to see an image often enables faster recognition, when compared to reading, wherein the size of the image becomes more important since larger images can provide richer details.

To solve these problems a graphical user interface with a grid-like array has been developed, where many items are shown on top of each other and next to each other. Thus the user can see a larger section of the list, and labels and images of items have quite practical sizes. Because the grid consists of many columns and rows a multiway input device, at least a 4-way input device, is required. Further-more the use of this kind of list is in many solutions quite slow, because the user must navigate in many different directions. Another problem in the matrix presentation is that the item labels are often short because the area for displaying them is very limited. Therefore, labels are often presented with small-sized font, which may render the reading of their content difficult.

Accordingly, the present invention relates to a user-friendly menu forming method in an electronic device that substantially eliminates one or more problems resulting from the limitations and disadvantages of the related art.

The primary aim of the present invention is to present a method in which a user friendly navigation function is integrated in a well-defined menu structure.

To attain this purpose, a method of forming a menu on a display of an electronic device is provided, which menu comprises at least two function elements for selecting functions, wherein the method comprises defining at least three display areas that are substantially adjacent to each other in a first direction, defining at least a first identification part and a second identification part that are contained in the function element, displaying the first identification part of the function element in said first direction on outermost display areas, displaying the second identification part of the function element on at least one display area between said outermost display areas in such a manner that the second identification part of the first function element and the second identification part of the second function element are positioned at least substantially next to each other in a second direction substantially perpendicular to said first direction.

The invention further relates to a graphical user interface (GUI) of an electronic device, the function of the GUI being to present various menus, which menus comprise at least two function elements for selecting functions, wherein at least three display areas that are substantially adjacent to each other in a first direction are formed for at least two function elements, the first identification part of the function element is displayed in said first direction on outermost display areas, the second identification part of the function element is displayed on at least one display area between said outermost display areas in such a manner that the second identification part of the first function element and the second identification part of the second function element are positioned at least substantially next to each other in a second direction substantially perpendicular to said first direction.

A device is provided, which device comprises a display with a graphic user interface, the function of the GUI being to present various menus, which menus comprise at least two function elements for selecting functions, wherein at least three display areas that are substantially adjacent to each other in a first direction are formed for at least two function elements, the first identification part of the function element is displayed in said first direction on outermost display areas, the second identification part of the function element is displayed on at least one display area between said outermost display areas in such a manner that the second identification part of the first function element and the second identification part of the second function element are positioned at least substantially next to each other in a second direction substantially perpendicular to said first direction.

A system is provided, which system comprises a display unit with a graphic user interface, the function of the GUI being to present various menus, which menus comprise at least two function elements for selecting functions, wherein at least three display areas that are substantially adjacent to each other in a first direction are formed for at least two function elements, the first identification part of the function element is displayed in said first direction on outermost display areas, the second identification part of the function element is displayed on at least one display area between said outermost display areas in such a manner that the second identification part of the first function element and the second identification part of the second function element are positioned at least substantially next to each other in a second direction substantially perpendicular to said first direction.

A software program of displaying a menu on a display of an electronic device is provided, the program comprising a number of instructions, wherein the instructions, when executed by a processor, prompt the processor to perform defining at least three display areas that are substantially adjacent to each other in a first direction, defining at least a first identification part and a second identification part that are contained in the function element, displaying the first identification part of the function element in said first direction on outermost display areas, displaying the second identification part of the function element on at least one display area between said outermost display areas in such a manner that the second identification part of the first function element and the second identification part of the second function element are positioned at least substantially next to each other in a second direction substantially perpendicular to said first direction.

A storage medium readable by a computer is provided, said medium containing information stored therein, wherein the information, when executed by a processor, prompts the processor to perform defining at least three display areas that are substantially adjacent to each other in a first direction, defining at least a first identification part and a second identification part that are contained in the function element, displaying the first identification part of the function element in said first direction on outermost display areas, displaying the second identification part of the function element on at least one display area between said outermost display areas in such a manner that the second identification part of the first function element and the second identification part of the second function element are positioned at least substantially next to each other in a second direction substantially perpendicular to said first direction.

The dependent claims will present some preferred embodiments of the invention.

Additional advantages, objects and features of the invention will be set forth in part in the description hereinbelow and in part they will become apparent to those skilled in the art upon examination of the following. The objectives and other advantages of the invention may be realized and attained by the structure particularly pointed out in the written description and claims hereof as well as in the appended drawings.

To attain the objectives and advantages mentioned above, the menu forming method according to the invention is characterized in that at least three display areas that are substantially adjacent to each other in a first direction are formed for at least two function elements. Each function element consists of information in text format and in some kind of visual format (for example images, photos, pictures, drawings etc., for which the term "image" will be used hereinbelow). The image information is displayed in said first direction on the outermost display areas. The identifying information (for example textual string, a number, a graph, etc., for which the term "label" will be used hereinbelow) is displayed on at least one display area between said outermost display areas in such a manner that the label contained in the first function element and the label contained in the second function element are positioned at least substantially next to each other in a second direction substantially perpendicular to said first direction.

Usually the first direction is the horizontal direction and the second direction is the vertical direction in the display on the screen of the device.

One main idea of the invention is to display as large images as possible while leaving a reasonable space available for the item label. Although the area for the item label is reduced, often seeing the image and its details enables faster recognition than reading its name, which makes the image size more important.

One embodiment of the present invention enables displaying twice as many large thumbnail images in the same space as in a similar list where the list items do not "overlap". In addition, the invention preserves interaction with a 2-way input device. This may make the list suitable for mobile use, since the interaction is less complex and error-prone than the interaction with multiway input devices, e.g., a 4-way device.

Another embodiment of the present invention makes it possible to display twice as many list items with large images in the same screen space when compared to "traditional" list. This may reduce the need of scrolling and it may help the user to anticipate the forthcoming items. Irrespective of the overlapped layout, the interaction may be handled with a 2-way input device (up and down), which makes the use of the list easier than the use of a grid (which use benefits of 4-way interaction) in many mobile situations.

Figure 2:
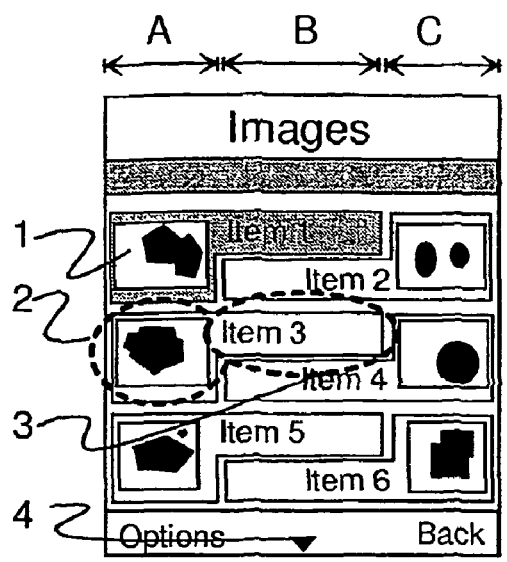
Figure 3:
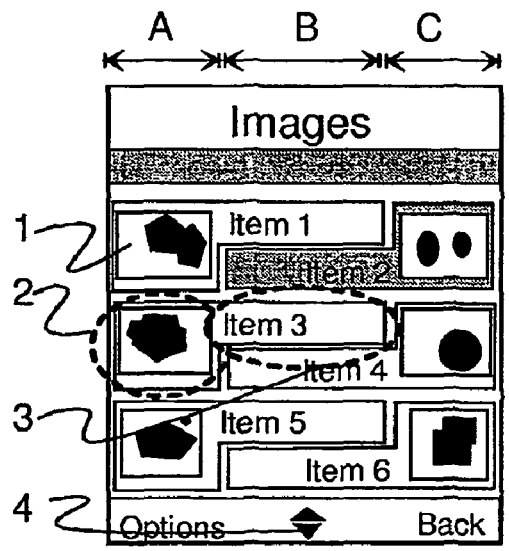
Figure 4:
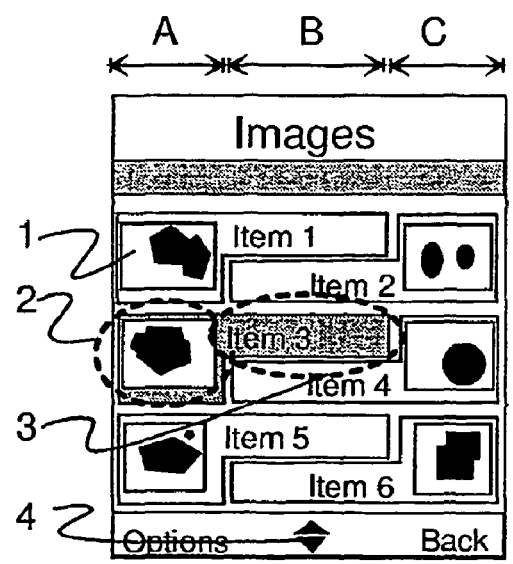
Figure 5:
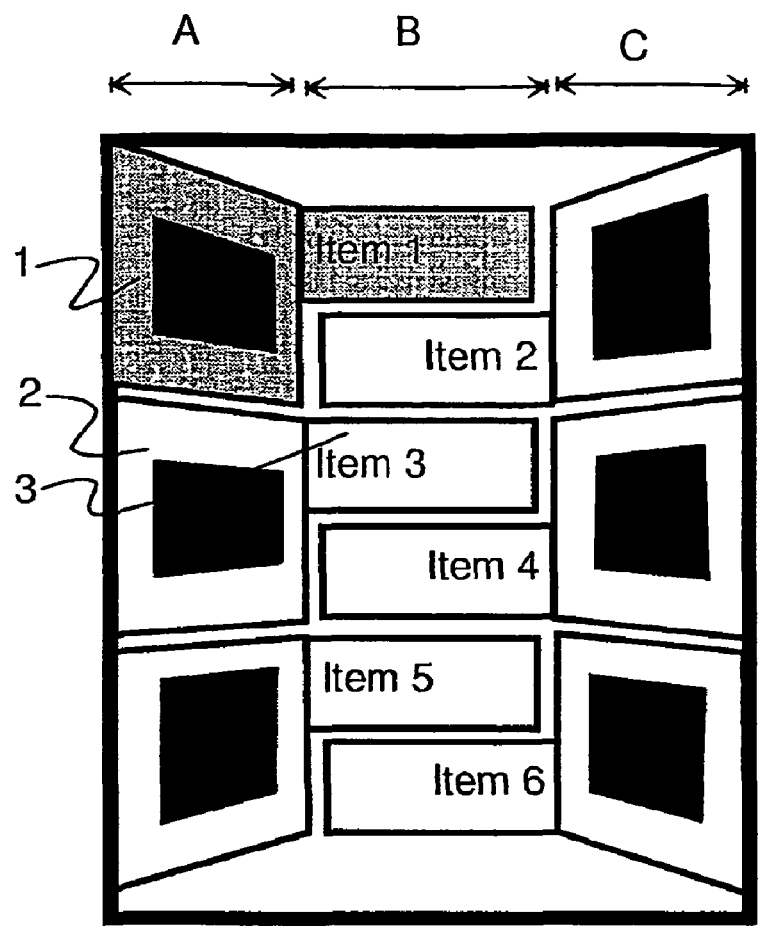
Figure 6:
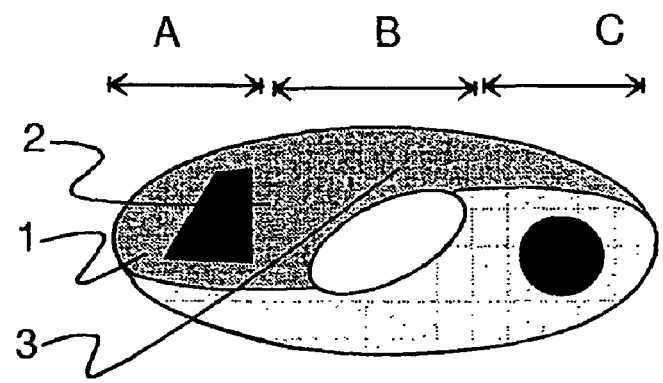

The above and other objects, features and advantages of the present invention will become more apparent from the following detailed description when taken in conjunction with the accompanying drawings in which:

FIG. 1 illustrates an exemplary menu window of a mobile terminal according to an embodiment of the present invention, FIGS. 2 to 4 illustrate exemplary scrolling steps in the menu window of FIG. 1, FIG. 5 illustrates a second embodiment of the present invention, FIG. 6 illustrates a third embodiment of the present invention.

One embodiment of the present invention will be described hereinbelow with reference to the accompanying drawings. In the following description well-known functions and/or constructions will not be described in detail since they would obscure the invention.

FIG. 1 shows a view on the display of a user interface according to one embodiment. The display could be a screen of a mobile phone or a personal digital assistant (PDA) or some other device. Said view comprises at least a list of function elements 1. Function element 1 shows information in visual format (image, picture, etc.) and in text format (letters, numbers, etc.). The visual information is shown in an "image cell" 2 of the function element 1 and the label is shown in a "label cell" 3 of the function element. This information helps the user to identify each function element as easily as possible by looking only at the image or label or both. In this embodiment there are also navigation aids 4 (arrows) on the display, showing the possible navigation directions.

The user can control the function (or functions) which is (are) connected to one function element 1 by selecting and activating the function element by a control device. The act of scrolling the menu will be explained hereinbelow. Functions of the function elements can vary depending on the solution, for example the functions can include actions such as showing a picture, running a program or calling to someone. Thus the solutions which are controlled by these function elements 1 can include for example a phone number directory, an image manager, a phone manager, a message manager and an electronic organizer.

The list is composed of function elements 1, which "overlap" each other partially although they do not hide each other. More specifically, the display is divided into three display areas (in other words three columns). In FIG. 1 columns are named A, B and C. The outermost columns A and C are for presenting large images (the "image cells" 2), and the column B between the outermost columns is reserved for the labels of the items (the "label cells" 3). The label may be, for example, the image name or creation date. Each of the function elements 1 uses space either from column A or C and from the column B. Because the function element 1 in the column A or C is higher than the element in column B, the list of function elements "overlap" in column B.

Scrolling of the list starts from the left-hand function element 1, which is positioned in columns A and B, proceeding to the right-hand function element (columns B and C) and then to the next row as shown in FIGS. 2, 3 and 4, and naturally vice versa upward. In FIG. 2 the highlighted function element 1 is the first item, and in FIG. 3 the highlighted function element is the second item, and in FIG. 4 the highlighted function element is the third item.

In the foregoing embodiment the scrolling is carried out in the vertical direction. That kind of two-way movement is very advantageous in mobile devices, because displays and control devices are usually very small. Therefore, it is convenient if there are as few navigation directions as possible. In many cases 2 (or 3)-way control devices are also more reliable than multiway control devices.

As stated hereinabove the "image cell" 2 of the function element 1 is higher than the "label cell" 3 of the function element. The label of the function element 1 is also arranged close to said image information of the function element, and thus it is very easy to see the context of the image and the label. If the label is so long in size that it cannot fit between the images, it will be cut. This cutting operation can be advantageously indicated somehow, for example by three dots after the text.

The form of the function element 1 can vary a great deal. In one embodiment (shown in FIG. 5) perspective distortion is used for making the images narrower in order to save space for a longer text in the item label.

In one other embodiment, shown in FIG. 6, the screen of the device has a round shape and the menu of the user interface also has the same rounded layout (not a rectangular format as in the foregoing embodiments). Consequently, in the scope of this invention it is possible to use many different shapes, such as rectangular and/or rounded shapes to form the different identification parts 2, 3.

In the foregoing embodiments image information was shown in the "image cells" 2 of the function elements 1, and information in text format was shown in the "label cells" 3 of the selection elements 1. Within the scope of this invention it is also possible to use whichever of these identification parts 2, 3 to display image and/or text information. Thus the identification part 2, 3 can be an image, a picture, an icon, a symbol, a photo, a graph, text, etc. or a combination of some of the foregoing.

By combining the modes and structures presented in connection with the different embodiments of the invention presented above, it is possible to provide various embodiments of the invention in accordance with the spirit of the invention. Therefore, the above-presented examples must not be interpreted as restrictive to the invention, but the embodiments of the invention can be freely varied within the scope of the inventive features presented in the claims hereinbelow.

What is claimed is:

1. A method comprising
defining a first display area, a second display area and a third display area that are substantially adjacent to each other in a first direction of a menu on a display of an electronic device, which menu comprises at least two function elements for selecting functions,
defining at least a first identification part and a second identification part that are contained in each function element of the at least two function elements, wherein the first identification part comprises an image and the second identification part comprises textual information,
displaying a first identification part of a first function element of the at least two function elements on the first display area in said first direction, and a first identification part of a second function element of the at least two function elements on the third display area in said first direction, and
displaying the second identification part of each of the at least two function elements on the second display area between the first display area and the third display area in such a manner that a second identification part of the first function element and a second identification part of the second function element are aligned at least substantially next to each other in a second direction substantially perpendicular to said first direction such that the second identification part of the first function element and the second identification part of the second function element in combination occupy an amount of space that is substantially equivalent to an amount of space occupied by the first identification part of the first function element in said second direction and substantially equivalent to an amount of space occupied by the first identification part of the second function element in said second direction.

2. The method according to claim 1, wherein dimensions of the first identification part of the first function element in the second direction are larger than dimensions of the second identification part of the first function element in said second direction.

3. The method according to claim 2, wherein a size of the first identification part in the second direction is twice a size of the second identification part in said second direction.

4. The method according to claim 1, wherein the first identification part is an image and the second identification part is a label.

5. The method according to claim 1, wherein at least one function element is connected to at least one of the functions of the device.

6. The method according to claim 5, wherein a function of said at least two function elements is a phone number directory, an image manager, a phone manager, a message manager or an electronic organizer.

7. The method according to claim 1, wherein navigation between the first function element and the second function element is conducted in the second direction.

8. A graphic user interface of an electronic device for presenting at least two function elements for selecting functions, wherein
a first display area, a second display area and a third display area that are substantially adjacent to each other in a first direction are formed for said at least two function elements,
a first identification part of a first function element of the at least two function elements is on the first display area in the first direction and a first identification part of a second function element of the at least two function elements is on the third display area in the first direction, wherein the first identification part comprises an image, and a second identification part of each function element of the at least two function elements is displayed on the second display area between the first display area and the third display area in such a manner that the second identification part of the first function element and the second identification part of the second function element are aligned at least substantially next to each other in a second direction substantially perpendicular to said first direction such that the second identification part of the first function element and the second identification part of the second function element in combination occupy an amount of space that is substantially equivalent to an amount of space occupied by the first identification part of the first function element in said second direction and substantially equivalent to an amount of space occupied by the first identification part of the second function element in said second direction, wherein the second identification part comprises textual information.

9. The graphic user interface according to claim 8, wherein dimensions of the first identification part of said each function element in the second direction are substantially larger than dimensions of the second identification part of said each function element in said second direction.

10. The graphic user interface according to claim 8, wherein a size of the first identification part in the second direction is twice a size of the second identification part in said second direction.

11. The graphic user interface according to claim 8, wherein
the first identification part is an image, and
the second identification part is a label.

12. A device comprising a display with a graphic user interface, for presenting a menu comprising at least two function elements for selecting functions, wherein
a first display area, a second display area, and a third display area that are substantially adjacent to each other in a first direction are formed for said at least two function elements,
a first identification part of a first function element of the at least two function element is on the first display area in the first direction, and a first identification part of a second function element of the at least two function elements is on the third display area in the first direction, wherein the first identification part comprises an image, and
a second identification part of each function element of the at least two function elements is displayed on the second display area between the first display area and the third display area in such a manner that the second identification part of the first function element and the second identification part of the second function element are aligned at least substantially next to each other in a second direction substantially perpendicular to said first direction such that the second identification part of the first function element and the second identification part of the second function element in combination occupy an amount of space that is substantially equivalent to an amount of space occupied by the first identification part of the first function element in said second direction and substantially equivalent to an amount of space occupied by the first identification part of the second function element in said second direction, wherein the second identification part comprises textual information.

13. The device according to claim 12, wherein dimensions of the first identification part of said each function element in the second direction are substantially larger than dimensions of the second identification part of said each function element in said second direction.

14. The device according to claim 12, wherein a size of the first identification part in the second direction is twice a size of the second identification part in said second direction.

15. The device according to claim 12, wherein
the first identification part is an image, and
the second identification part is a label.

16. The device according to claim 12, wherein the device is one of the following: a mobile phone, a personal digital assistant, a hand held computer, a digital camera, a laptop or a personal computer.

17. A system comprising a display unit with a graphic user interface for presenting a menu comprising at least two function elements for selecting functions, wherein
a first display area, a second display area and a third display area that are substantially adjacent to each other in a first direction are formed for said at least two function elements,
a first identification part of a first function element of the at least two function element is on the first display area in the first direction, and a first identification part of a second function element of the at least two function elements is on the third display area in the first direction, wherein the first identification part comprises an image, and
a second identification part of each function element of the at least two function elements is displayed on the second display area between the first display area and the third display area in such a manner that the second identification part of the first function element and the second identification part of the second function element are aligned at least substantially next to each other in a second direction substantially perpendicular to said first direction such that the second identification part of the first function element and the second identification part of the second function element in combination occupy an amount of space that is substantially equivalent to an amount of space occupied by the first identification part of the first function element in said second direction and substantially equivalent to an amount of space occupied by the first identification part of the second function element in said second direction, wherein the second identification part comprises textual information.

18. The system according to claim 17, wherein the dimensions of the first identification part of said each function element in the second direction are substantially larger than dimensions of the second identification part of said each function element in said second direction.

19. The system according to claim 17, wherein a size of the first identification part in the second direction is twice a size of the second identification part in said second direction.

20. The system according to claim 17, wherein
the first identification part is an image, and
the second identification part is a label.

21. A computer readable medium encoded with a computer program, which when executed by an electronic device, cause the device to perform:
defining a first display area, a second display area and a third display area that are substantially adjacent to each other in a first direction,
defining at least a first identification part and a second identification part that are contained in each function element of at least two function elements, wherein the first identification part comprises an image and the second identification part comprises textual information, displaying a first identification part of a first function element of the at least two function elements on the first display area in said first direction, and a first identification part of a second function element of the at least two function elements on the third display area in said first direction, and displaying the second identification part of each function element of the at least two function elements on the second display area between the first display area and the third display area in such a manner that a second identification part of the first function element and a second identification part of the second function element are aligned at least substantially next to each other in a second direction substantially perpendicular to said first direction such that the second identification part of the first function element and the second identification part of the second function element in combination occupy an amount of space that is substantially equivalent to an amount of space occupied by the first identification part of the first function element in said second direction and substantially equivalent to an amount of space occupied by the first identification part of the second function element in said second direction.

22. A storage medium readable by a computer, said medium containing information stored therein, which when executed by said computer cause the computer to perform defining a first display area, a second display area and a third display area that are substantially adjacent to each other in a first direction, defining at least a first identification part and a second identification part that are contained in each function element of at least two function elements, wherein the first identification part comprises an image and the second identification part comprises textual information displaying a first identification part of a first function element of the at least two function elements on the first display area in the first direction, and a first identification part of a second function element of the at least two function elements on the third display area in the first direction, displaying the second identification part of each function element of the at least two function elements on the second display area between the first display area and the third display area in such a manner that a second identification part of the first function element and a second identification part of the second function element are aligned at least substantially next to each other in a second direction substantially perpendicular to said first direction such that the second identification part of the first function element and the second identification part of the second function element in combination occupy an amount of space that is substantially equivalent to an amount of space occupied by the first identification part of the first function element in said second direction and substantially equivalent to an amount of space occupied by the first identification part of the second function element in said second direction.

\* \* \* \* \*